United States Patent
Peyron et al.

(10) Patent No.: US 7,398,810 B2
(45) Date of Patent: Jul. 15, 2008

(54) TIRE HAVING AN ELEMENT OR COVERING ATTACHED TO A SURFACE THEREOF

(75) Inventors: Georges Peyron, Riom (FR); Alain Cottin, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/187,818

(22) Filed: Jul. 25, 2005

(65) Prior Publication Data

US 2006/0016534 A1 Jan. 26, 2006

Related U.S. Application Data

(63) Continuation of application No. PCT/EP04/00342, filed on Jan. 19, 2005.

(30) Foreign Application Priority Data

Jan. 23, 2003 (FR) .................................. 03 00752

(51) Int. Cl.
*B60C 13/00* (2006.01)
*B60C 13/02* (2006.01)
*B60C 11/00* (2006.01)

(52) U.S. Cl. ....................... 152/523; 152/450; 152/539; 152/209.1

(58) Field of Classification Search .............. 152/209.1, 152/450, 523, 539
See application file for complete search history.

(56) References Cited

U.S. PATENT DOCUMENTS

6,477,894 B1 11/2002 Koch et al.
2002/0124934 A1 9/2002 Koch et al.

FOREIGN PATENT DOCUMENTS

| EP | 0 829 382 | | 3/1993 |
|---|---|---|---|
| EP | 1 006 167 | | 6/2000 |
| EP | 1253025 | * | 10/2002 |
| EP | 1 254 787 | | 8/2004 |
| FR | 2639880 | * | 6/1990 |
| JP | 60113704 | * | 6/1985 |
| JP | 06211007 | | 8/1994 |
| JP | 06219109 | | 8/1994 |
| JP | 11078406 | * | 3/1999 |

OTHER PUBLICATIONS

Machine translation of JP 11078406.*

* cited by examiner

*Primary Examiner*—Justin Fischer
(74) *Attorney, Agent, or Firm*—Buchanan Ingersoll & Rooney PC

(57) ABSTRACT

A tire is provided, on a surface thereof, an applicaiton having a top layer exposed to the air and a bottom layer in contact with the tire. The top layer can be a rigid element and/or a marking covering, or a device for measuring or monitoring the tire. The bottom layer is a foam having a void ratio of at least 40%, a thickness of at least 0.5 mm, and a density ranging from 0.02 $g/cm^3$ to 0.5 $g/cm^3$.

17 Claims, 2 Drawing Sheets

TIRE HAVING AN ELEMENT OR COVERING ATTACHED TO A SURFACE THEREOF

This application is a continuation of International Application PCT/EP04/000342 filed on Jan. 19, 2005 and which published as WO 2004/065140 on Aug. 5, 2004.

BACKGROUND

The invention concerns the application of coverings and/or elements to the surface of rubber articles, in particular tires. More particularly, it concerns the application of these elements and/or coverings after the vulcanization of such articles. The invention concerns in particular the marking, colored or not, of part of the surface of the tire by applying a rigid or non-rigid element and/or a covering.

The tires can carry, for decorative or identification purposes, a marking, colored or not, directly applied to part of the generally external surface of the tire. "Marking" means, in the text, any element or covering affixed to the said surface of the tire, generally after its vulcanization. This marking can consist of a so-called rigid element, a soft element, a layer of lacquer, a coat of paint, etc.

"Rigid element" means elements incapable of following the successive deformations of a tire when it is running. These so-called rigid elements can according to circumstances be completely non-deformable or flexible but non-elastic to the scale of the deformations of the tire. In other words, they can, where necessary, bend but be incapable of following the local variations in the area of the surface of the tire following changes in radius of curvature of the said tire. These elements can consist of metal, plastic, elastomer, ceramic, etc.

The marking of a tire, produced in an appropriate material, can be in one or more colors, including white. However, producing markings, colored or not, on tires poses great difficulties.

Such markings are intended to cover at least part of the surface of tires. Since it is a case of a surface covering, these markings are particularly intended to cover surfaces of tire covers said to be "non-wearing", that is to say which are not in contact with the road under normal conditions of use of the said tires. Thus such colored markings, having decorative and identification purposes in particular, can constitute at least partially the external surface of a tire cover sidewall or groove bottoms of the tread.

The complexity of directly covering the surface of tires with such markings is well known to persons skilled in the art. There exist in fact two major difficulties in this implementation, firstly the nature of the compositions in the tire which acts on the markings, as will be seen more explicitly below, and secondly the stresses to which the tire is subjected when it is running which cause significant deformations of the tire and therefore of its surface, to which the markings must be able to adapt.

The vulcanized compositions of diene rubbers, both natural and synthetic, because of the presence of double bonds on their molecular chains, are liable to deteriorate more or less rapidly after prolonged exposure to the atmosphere, because of known mechanisms of oxidation and ozonolysis. These degradation mechanisms are also accelerated under the combined action of heat by thermo-oxidation, or that of light by photo-oxidation (see for example: "*Photo-oxydation and stabilisation of polymers*", Trends in Polym. Sci., Vol. 4, No 3, 1996, 92-98; "*Degradation mechanisms of rubbers*", Int. Polym. Sci. and Technol., Vol 22, No 12, 1995, 47-57).

It has been possible to inhibit all these phenomena of degradation of the tire, linked to its aging, little by little by virtue of the development and introduction into diene rubber compositions intended for the manufacture of tires of various antidegrading agents such as antioxidants or antiozonants. Compounds have even been found which are able to fulfil these two functions simultaneously; the most effective, both as antioxidants or antiozonants, are in a known manner derivatives of quinoline, such as for example 2,2,4-trimethyl-1,2-dihydroquinoline ("TMQ") or derivatives of p-phenylenediamine ("PPD") even more active than the first, such as for example N-1,3-dimethylbutyl-N'-phenyl-p-phenylenediamine ("6-PPD") or N-isopropyl-N'-phenyl-p-phenylenediamine ("I-PPD"). These antidegradants of the TMQ and PPD type, sometimes even combined, are today very widespread and used in an almost routine manner in conventional diene rubber compositions filled at least partly with carbon black, giving them their characteristic black color.

However, the agents cited above, in particular TMQ or PPD derivatives, are not stable under light and, under the effect of UV radiation, generated colored chemical substances which cause an impairment of the color of the rubber compositions containing them, staining them dark brown.

In addition, antidegradants are mobile on the molecular scale within the rubber composition containing them. This mobility extends to the compositions adjacent to that initially containing the antidegradants. Thus these antidegradants are liable to migrate into a colored marking composition fixed to the rubber composition containing them, and to stain it.

Moreover, in order to limit the degradation due to ozone, elastomer compositions also normally incorporate waxes which, statically, afford additional protection with respect to antiozonants by the formation of a protective surface coating. However, the waxes, which are also characterised by their ability to migrate as far as the surface of the rubber articles, modify the external appearance of the surfaces of the elastomer compositions by staining them or making them dull and grey. This phenomenon is referred to as the "blooming" of the waxes.

This is why it is extremely complex to produce a marking of durable appearance, colored or not, intended to cover part of the external surface of tire covers resisting staining and alteration due to the antioxidants, antiozonants and waxes present in the elastomer compositions used in tires.

The majority of solutions propose the development of color markings whose composition combines both the various constituents for obtaining color and non-migration of the waxes or staining products. However, it is also necessary, as stated, for the marking to be capable of enduring the mechanical stresses to which the tire is subjected.

However, the solutions to these two problems which are accessible at the present time are often opposing and are therefore not satisfactory for improving the compromise between durable appearance and resistance to mechanical stresses. This is because:

when the covering is sufficiently flexible to accommodate repeated deformations throughout the life of the tire, the molecular mobilities are too great therein for completely preventing the migrations of these staining products;

when the coating is rigid, thus restricting the molecular mobility, it is no longer capable of following the deformations of a tire without causing excessively great concentrations of stresses which, according to circumstances, will result in a detachment or breakage of the covering.

It therefore proves necessary, in order to obtain durable marking, to be able at least to reduce or even eliminate the impairment of the color and/or the brightness of the marking affixed to the external surface of a tire, whilst conferring on it an ability to accommodate deformations of the tire.

SUMMARY OF THE INVENTION

The applicant has discovered in a surprising fashion that one way of resolving both the problem of a chemical nature and the problem of a mechanical nature related to the marking of a tire comprises interposing a layer of foam between the part of the surface of the tire to be marked and the marking element and/or covering. The layer of foam and the marking element and/or covering form a stack of two layers, hereinafter referred to in the text as an application.

In addition, it is more and more being sought to store information in electronic chips integrated in or fixed to the tire, and to make measurements, in particular pressure and/or temperature monitoring, which require the use of sensors or other signal connection, communication, transmission or reception systems. These devices, which require rigid supports, pose real problems of fixing to the tire since they cannot follow the deformations of the tire. This is why the solution afforded by the invention also makes it possible to surmount the problems of fixing these devices to the tire.

Consequently a first object of the invention consists of a tire comprising, on at least part of its surface, at least one application, characterized in that the said application is composed of a first layer (e.g, a marking or covering or other element in contact with the air constituting the top layer of the application and a second layer in contact with the tire constituting the bottom layer of the application, said bottom layer of the application comprising a visible and very deformable low-density foam.

In the text, for a stack of layers, the terminology "bottom" will be adopted to designate the layer/surface in contact with the tire and closest to the carcass ply and "top" to designate the layer/surface farthest away from the carcass ply, in particular in contact with the air.

The solution afforded by the inventors of interposing foam between the surface of the tire and the marking element and/or covering allows chemical decoupling in order to prevent chemical exchanges by migration and therefore the staining of the said covering and/or element, without its being necessary for the latter itself to possess characteristics of impermeability, and to simultaneously achieve a mechanical decoupling in order to preserve the fixing of the said covering and/or element and its form.

DESCRIPTION OF THE DRAWING

Other characteristics and advantages of the invention will emerge from a review of a preferred example embodiment of a tire according to the invention, with reference to the accompanying drawing in which FIGS. 1-3 each depict a radial half-section of a tire carrying a marking according to the invention, and to a review of the method of fixing to the tire a marking covering and/or element according to the invention.

DESCRIPTION OF A PREFERRED EMBODIMENT

Figure 1:
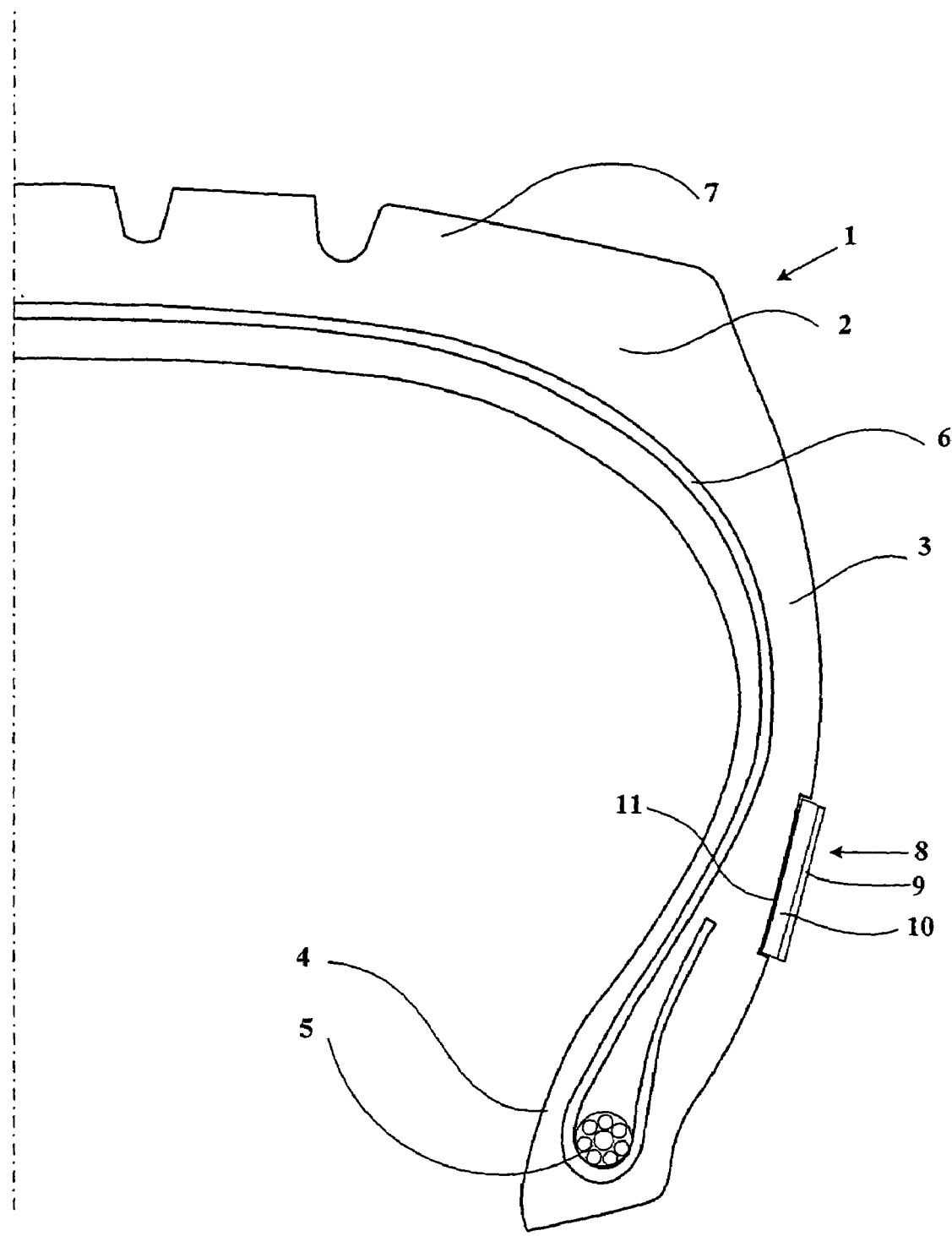
FIG. 1 depicts a radial half-sectioin of a tire according to a first embodiment of the invention.

The marking of a tire constitutes one aspect of the invention. This aspect is described here purely by way of example and is not intended to constitute a limitation to the invention. A person skilled in the art will understand that the invention also comprises the fixing to the surface of the tire of an element and/or covering intended for purposes other than marking, such as the fixing of monitoring, measuring, etc. devices.

Thus, by way of example, the accompanying figure depicts schematically a radial half-section of a tire 1 with carcass reinforcement. This tire 1 comprises in the figure a crown 2, a sidewall 3, a bead 4, a carcass reinforcement 6 extending from one bead to the other. The crown 2 is surmounted by a tread 7. The carcass reinforcement 6 is wound around the two bead wires 5 (only one being shown on the half-section in the figure) in each bead 4.

The invention thus concerns a tire 1 comprising on at least part of its surface at least one application 8 according to the invention. The part of the tire on which the application according to the invention is fixed has a rubber composition based on at least one essentially saturated diene elastomer, at least one essentially unsaturated diene elastomer or a mixture of these two types of elastomer. The rubber composition can contain conventional additives and in particular agents for protection against ozone, oxidation, etc.

"Diene" elastomer means in a known manner an elastomer issuing at least partly (i.e. a homopolymer or a copolymer) from diene monomers (monomers carrying two double carbon-carbon bonds, conjugate or not). These diene elastomers can be classified in two categories: "essentially unsaturated" or "essentially saturated".

In general terms, "essentially unsaturated" diene elastomer means a diene elastomer issuing at least partly from conjugated diene monomers, having a level of units of diene origin (conjugated dienes) which is greater than 15% (% molar).

Thus, for example, diene elastomers such as butyl rubbers or copolymers of dienes and alpha-olefins of the EPDM (ethylene-propylene-diene terpolymer) type do not fall within the above definition and can in particular be termed "essentially saturated" diene elastomers (low or very low level of units of diene origin, always less than 15%).

According to one embodiment of the invention shown in FIG. 1, the part of the tire to which the application according to the invention is fixed is the sidewall of the tire. The accompanying figure illustrates this embodiment and more particularly a fixing of the application 8 to the radially bottom or inner part of the sidewall 3. The composition of this part of the tire can then contain at least one essentially saturated diene elastomer, in particular at least one EPDM copolymer, whether this copolymer be for example used or not in a mixture with one or more of the essentially unsaturated diene elastomers.

Figure 2:
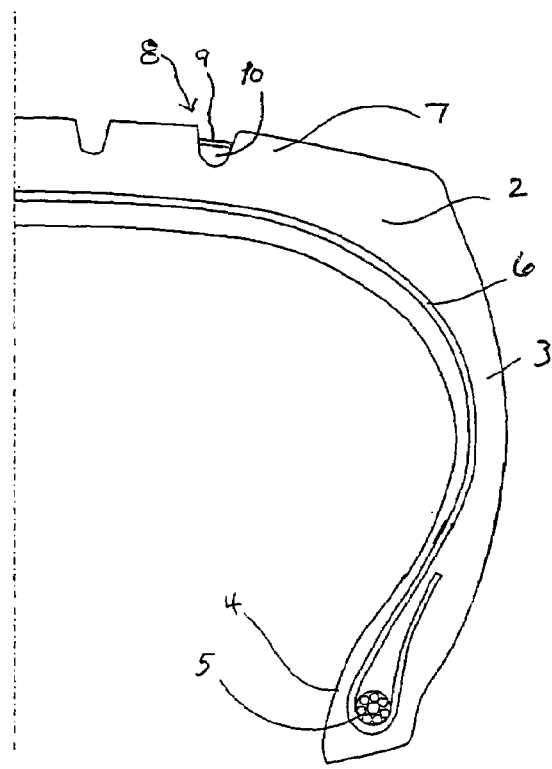
FIG. 2 depicts a radial half-section of a tire according to a second embodiment of the invention.

According to another embodiment of the invention shown in FIG. 2, the part of the tire to which the application according to the invention is fixed is an internal tire rubber compound or any other layer or object impermeable to air. The composition of this part of the tire can then contain at least one essentially saturated diene elastomer of the isobutene and isoprene copolymer (butyl rubber) type, as well as the halogenated versions of these copolymers.

Figure 3:
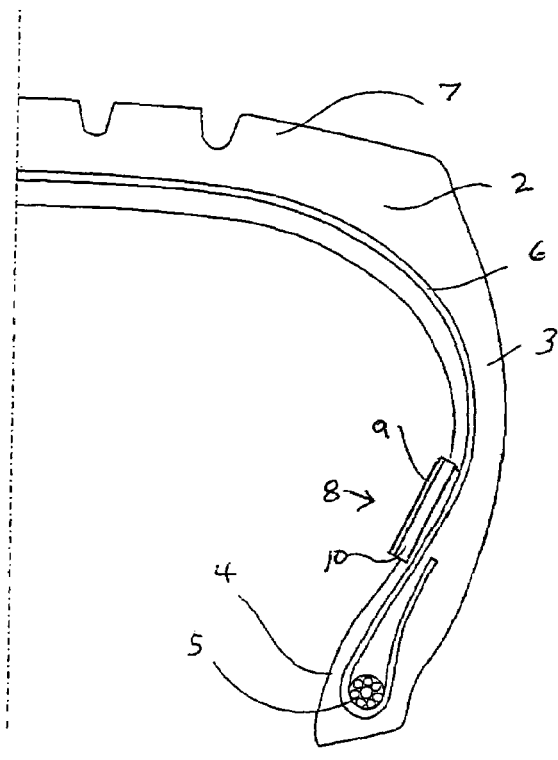
FIG. 3 depicts a radial half-section of a tire according to a third embodiment of the invention.

According to yet another embodiment of the invention shown in FIG. 3, the part of the tire to which the application according to the invention is fixed is the tread, in the particular the groove bottoms of the tread. The composition of this part of the tire can then contain at least one essentially unsaturated diene elastomer.

Referring to FIG. 1, the application 8 according to the invention thus comprises a first layer 9 in contact with the air constituting the top layer of the application and a second layer 10 in contact with (exposed to) the tire constituting the bottom layer of the application. This bottom layer 10 of the application consists of a visible very deformable low-density foam. It affords chemical and mechanical decoupling between the surface of the tire and the top layer of the application, constituting the marking element and/or covering.

The layer of foam composing the bottom layer 10 of the application 8 according to the invention consists of a low-density foam having a high void ratio. This opposes chemical migrations and thus prevents or very greatly limits the migrations of the staining agents contained in the elastomer mixture constituting the part of the tire to which the tire application is fixed. This is because the high void ratio and the low density gives rise to a decrease in the cross-section of passage and extension of the path all along the walls of the cells of the foam throughout the thickness of the foam. Naturally, this effect is also closely linked to the thickness of the layer of foam.

The limitation of the migration of the staining agents can be reinforced by a careful choice of the material making up the foam, which can have characteristics of impermeability of the foam material vis-a-vis the migrants.

Moreover, the advantage of a foam is clearly to have a sufficient flexibility of structure to follow the deformations of the tire.

It is thus possible to choose various kinds of material for forming this foam, its thickness, its void ratio and its density being, as just stated, directly linked to this choice.

In general terms, the layer of foam can have a thickness of at least 0.5 mm. Below this value, the chemical and mechanical decoupling will not be sufficient to allow a durable marking through its appearance and strength.

In general terms, when the application is fixed to part of the external surface of the tire, it should not project by more than 3 mm from the surface of the tire. The external surface of the tire is the visible surface of the tire which is not in contact with the inflation air. This is because the application projecting from the tire 1 beyond this value 3 mm would greatly increase the risk of tearing away of the said application.

In general terms, when the application is fixed to part of the surface oriented towards the cavity of the tire, in particular the internal rubber compound, it may have a thickness much greater than 3 mm. However, an excessive weight fixed to the inside of the tire would result in unbalancing it too greatly. Thus the thickness of the application will also depend on the density of the foam and the nature of the top layer. By way of example, it is nevertheless possible to envisage applications with a thickness ranging up to approximately 3 cm for fixing to part of the surface oriented towards the cavity of the tire.

According to one advantageous embodiment of the invention illustrated by the figure, with a view to anchoring of the application 8 and therefore better fixing of the application 8, the latter will be fixed in a cavity 11 of appropriate size, provided for this purpose in the tire 1. This cavity, which should have a depth of no more than the thickness of the application 8, is advantageously formed during the molding of the tire 1.

In general terms, the foam can have a density of at least 0.02 g/cm3, measured in a conventional manner. Below this limit the foam would not have sufficient mechanical strength. That is to say, below this value, the foam would deform too easily and, under the effect of centrifugal force, it might tear. The foam can have a density ranging up to 0.50 g/cm3. By way of example, the density of the foam can range from 0.05 g/cm3 to 0.30 g/cm3.

In general terms, the rigidity of the foam will advantageously be less than the rigidity of the material with the lowest rigidity to be decoupled. Preferentially, this difference should be at least 50%. Even more preferentially, the rigidity of the foam should be at least 3 times less than the rigidity of the material with the lowest rigidity to be decoupled. The rigidity is expressed by the modulus of extension at 10% elongation, measured in a conventional manner.

Another characteristic of the foam which can be used in the context of the invention is its void ratio. In general terms according to the invention the void ratio will advantageously be at least 40% so that the foam is sufficiently compressible. This void ratio can be calculated by comparing the density of the foam with that of the compact material constituting its matrix, measured by any conventional means.

The foam constituting the bottom layer of the application according to the invention will have at least one of the characteristics specified above relating to density, rigidity and void ratio. It will advantageously have at least two of those characteristics and, more advantageously still, it will have all of the following characteristics:
  a void ratio of at least 40%,
  a thickness of at least 0.5 mm, and
  a density ranging from 0.02 g/cm$^3$ to 0.5 g/cm$^3$.

Nevertheless, the characteristics of the foam stated above also depend on the nature of the materials for forming this foam. A person skilled in the art will know how to determine the characteristics required for a given material.

It is thus possible to choose an elastomer foam for which a specific density of 0.05 to 0.40 g/cm$^3$ represents a good working compromise. It is possible for the density to be situated particularly between 0.1 and 0.3 g/cm$^3$, for example ranging from 0.1 to 0.25 g/cm$^3$.

Among the materials which may constitute the matrix of these elastomer foams, there can be cited thermosetting elastomers such as natural rubber, polyisoprene, polybutadiene, butadiene-stirene, butyls, halogenated polycholoroprene butyls, polyepichloridrines, polyacrylics, polysulphides, chlorinated polyethylenes, chlorosulphonated polyethylenes, alkyl-chlorosulphonated polyethylenes, EPT (ethylene propylene termonomer), EPDM (ethylene-propylene-diene terpolymer), nitrile (NBR) and hydrogenated nitrile (HNBR), silicones, fluorinated elastomers, etc.; polyurethanes, polyureas, polyurethane-ureas; thermoplastic elastomers based on block polymers such as stirene polymers (SBS, SEBS, MBS, etc.) polyetheramides (PEBA, etc.), polyether esters and copolyesters, thermoplastic polyurethanes (TPU), vinyls (vinyl ethylene acetate copolymers, etc.) etc.; thermoplastic elastomers based on elastomer alloys or mixtures such as TPOs (thermoplastic polyolefins: EPDM+EPDM polypropylene+HD polyethylene, vinyl polychloride+vinyl polyacetate, TPU+polycarbonate, natural rubber or polyisoprene+polypropylene, NBR+polyvinyl chloride; cross-linked thermoplastic elastomers.

It should be noted that the foams composed of no more than 80% butyl elastomers are particularly advantageous because of their very good impermeability to staining agents. Note that this maximum level of butyl is related to the obtaining of good adhesion on surfaces consisting of essentially unsaturated diene elastomers.

It is also possible to choose non-elastomeric foams for which it will be advantageous to choose a lower specific density of around 0.02 to 0.10 g/cm$^3$.

It is thus possible to cite by way of non-elastomeric foams, normal plastics chosen from amongst polyolefins, polyvinyls, stirenes, acrylics, polyacetals, polyamides, polyesters, polycarbonates, polyoxyphenylenes, phenylene polysulphides, polyimides, polysulphones, polycycloolefins, polyketones, as well as mixtures and alloys thereof.

It is possible to choose foams with closed or open cells. In the case of foam with open cells a skin will have to surround the layer of foam in order to prevent possibilities of penetration of water when it is a case of an application on the external surface of the tire. This skin can be formed during the manufacture of the foam (integral foam) or applied subsequently (by bonding, lacquering, etc.).

In the case of a foam with closed cells, the skin is less essential but may be useful in order to have a surface which is smoother and therefore more aesthetic and easier to decorate.

For applications internal to the tire, in particular on the internal rubber compound, the decoupling foam will preferably have open cells in order not to be subjected to compression by the inflation air.

The element and/or covering constituting the top layer 9 of the application 8 to be affixed to the tire 1 can be in the form of:

a flexible layer which it is wished to decouple chemically in order to prevent migrations of agents constituting the rubber composition making up the part of the tire on which the marking element and/or covering is affixed, and/or to mechanically decouple in order to prevent any delamination, cracking, etc. This may be a layer of elastomeric mixture, colored or not, a layer of elastomeric paint, a layer of elastomeric lacquer, colored or not, etc.;

an essentially decorative rigid element, to be decoupled mechanically and possibly chemically. It may for example consist of a layer of rigid paint, a layer of rigid lacquer, colored or not, a plate, a sheet, a fabric, a molded or machined object, etc., made from any elastomeric, plastic, ceramic or metallic material, bare or decorated, which allows a choice of any pattern or color. It appears advantageous to effect the marking with so-called rigid elements rather than soft, on the one hand because it is possible to obtain objects of durable appearance by pressing, injection, etc. The rigidity of these objects substantially decreases the molecular mobility;

a rigid functional element such as for example, comprising in particular an electronic device, such as a sensor, an electronic chip, an electrical supply cluster, a reception or transmission antenna, or a layer of connection threads enabling the tire to receive or transmit information, with or without contact patch. Contact patch means the slug or base, generally elastomeric, on which these elements are fixed, removably or not, which allows the fixing of the assembly on the tire. Such elements are known to persons skilled in the art. By way of example, the elements described in EP-1,254,787, U.S. Publication 2002/0124934, and EP-1,006,167 can be cited.

The method of marking at least part of the surface of a tire 1 according to the invention comprises the following steps:

the affixing of the marking 9 on the top part of a layer of foam 10 of appropriate size thus forming a stack which will be referred to as the application 8, fixing the said application 8 by bonding the bottom part of the said layer of foam 10 to the part of the surface of the tire 1 to be marked.

Affixing of the marking, element and/or covering means the fixing of this marking to the foam by any appropriate means, such as in particular transfer, adhesive bonding, etc.

The method of fixing a rigid element, other than a marking, to at least part of the surface of the tire is similar. It comprises the steps of fixing, generally by adhesive bonding, the rigid element to the top part of a layer of foam of appropriate size forming an application, and fixing the said application by adhesive bonding of the bottom part of the layer of foam to the required part of the surface of the tire.

Various adhesive bonding methods can be used for bonding the layer of foam 10 to the surface of the tire 1, as well as for the bonding of the top layer 9 of the application 8 (marking or other element to be fixed) on the layer of foam 10.

For bonding the foam to the surface of the tire, the adhesive should be elastomeric in order to be able to follow the deformations of the tire.

For bonding the top layer 9 of the application 8 on the layer of foam 10, the rigidity of the adhesive has less importance since the top surface of the layer of foam 10 in contact with the top layer 9 of the application 8 is not deformed or only a little.

To simply the affixing, it is advantageously possible to use the same adhesive for constituting an adhesive surface which can be reactivated thermally.

For example, it is possible to use a self cross-linking polyurethane latex such as that sold by the company Avecia under the trade name "Neo-Rez R-550", depositing the latter on each of the surfaces to be assembled (the surface of the tire, the two surfaces of the layer of foam and the bottom surface of the top layer of the application). Note that, for the surfaces not directly having polar functions capable of bonding chemically with the polyurethane, it is necessary to provide an intermediate treatment, for example with a solution based on trichloro-isocyanuric acid (TIC) at 2 or 3% in an organic solvent, generally ethyl acetate.

The surface of the vulcanized tire is thus made to undergo a treatment in order to make the elastomers on this surface polar and to functionalize them. At least one layer consisting of an aqueous dispersion of polyurethane is applied to this treated surface and this layer is left to dry. The application of the aqueous dispersion of polyurethane can be carried out at room temperature. Thus this method can easily be implemented on the vulcanized tire without moreover requiring any heating operation, although it is possible, through a moderate rise in the temperature on the surface of the tire, to accelerate the drying operations.

It is also possible to use commercial adhesive foams spread with acrylic adhesive such as the foam sold by the company "3M" under the references 4416, which is a vinyl foam, and 4965 P, which is a neoprene foam.

The following examples illustrate the invention without however limiting it.

EXAMPLE 1

The samples of application used for these tests were bonded on a tire sidewall of the PAX 205-650 R 440 type, in the radially bottom part of the sidewall.

The elastomeric composition of the radial bottom part of the sidewall is based on a blend of elastomers containing natural rubber and polybutadiene, protected against ozone and oxidation by a mixture of 6-PPD, IPPD and TMQ.

The samples of application were produced in the form of small plates in portions of a ring with a length of 70 mm to a width of 5 mm, with, as the bottom layer in contact with the tire, a butyl foam sold under the name Bib Mousse by Michelin with 80% elastomer, with a density of 0.13 g/cm3, a void ratio of 88% and a thickness of 1.9 mm, to which there is fixed, with an adhesive B, a decorative rigid element A for which several materials have been tested.

The materials A1-A3 tested for the decorative rigid element are as follows. The dimensions of these elements, apart from their thickness, are the same as those of the foam in the bottom layer:

A1: polycarbonate sold under the name Meraklon by Bayer, with a thickness of 0.3 mm
A2: a polyester, PET (polyethylene terephthalate) with a thickness of 0.5 mm sold by Xtreme
A3: a PVC, with a thickness of 0.3 mm.

Two methods of adhesive bonding were used:

Adhesive bonding B1: polyurethane latex sold under the trade name Neo-Rez R-550 by Avecia for bonding the decorative element A to the foam and for bonding the foam to the tire. In the latter case, the surface of the tire is treated with a solution of TIC.

Adhesive bonding B2: for bonding the decorative element A to the foam and for bonding the foam to the tire. In the latter case, the surface of the tire is first of all treated with a solution of TIC and then covered with an adhesive based on polyurethane in accordance with Example 1 of the document EP-1 178 097, integrated in the present description by reference.

These samples were compared with a reference not comprising the bottom layer of foam. By way of reference, the rigid element A2 directly bonded to the tire sidewall was tested.

The tires carrying these various samples were mounted on passenger cars of the Peugeot 806 type. These vehicles were subjected to running on the road at a maximum speed of 110 km/h over a distance of between 1500 and 2000 km. At the end of this running, a first observation of the tires was carried out. Then a second running of approximately one thousand additional kilometers was carried out under the same conditions, at the end of which the wheels carrying the tires were removed in order to make the observation of the samples more thorough.

The results obtained are entered in the following table.

|  | Sample | | | |
| --- | --- | --- | --- | --- |
|  | Reference without foam | A1 with foam | A2 with foam | A3 with foam |
| Rigid element | PET polyester | Polycarbonate | PET polyester | PVC |
| Adhesive | B1 | B1 | B1 | B2 |
| 1st observation | Unstuck at 68 km | NTR* at 2000 km | NTR* at 2000 km | NTR* at 1500 km |
| 2nd observation |  | NTR* at 3600 km | NTR* at 3600 km | NTR* at 3000 km |

NTR: no unsticking, cracking or pulling away

It is found that, in accordance with the invention, marking by means of an application allows durable marking of the tire. The layer of foam enables the rigid marking element to be decoupled from the deformations of the tire, thus preventing any rupture or unsticking of the said rigid element.

EXAMPLE 2

During further tests, a sample of application was bonded to the sidewall of a tire of the PAX 205-650 R 440 type.

The elastomeric composition of the sidewall is based on a blend of elastomers containing natural rubber and polybutadiene, protected against ozone and oxidation by a mixture of 6 PPD, IPPD and TMQ.

The preservation of the appearance of this sample was tested by comparing it with a sample not comprising the bottom layer of foam and directly bonded to the tire sidewall.

The sample of application was produced in the form of a small plate in a portion of a ring with a length of 70 mm and a width of 5 mm, with, as the bottom layer in contact with the tire, an adhesive polyurethane foam, associated with an acrylic adhesive, sold by "3M" under the reference Ref. 4085. This foam has a density of 0.3 g/cm3, a void ratio of 70% and a thickness of 1.1 mm.

To this foam there is fixed a decorative stainable elastomeric element with a thickness of around 0.5 mm. This decorative element, reference "Mixture" in the table, is produced from the following elastomeric composition:

| 100 pce | 97% synthetic polyisoprene with a cis-1,4 structure sold by Nizhnekamsk under the reference IR6596 |
| --- | --- |
| 40 pce | Zéosil1165 M silica from Rhodia |
| 10 pce | Titanium oxide TiO2 of the octahedrite variety |
| 2 pce | Peroxide: 1,4-bis(tert-butyl peroxy-isopropyl)benzene |
| 2 pce | carbon black N772 |

The unit "pce" means parts by weight per 100 parts by weight of elastomer.

This element is fixed to the foam after having been previously treated with a solution of TIC. The application is fixed to the tire by adhesive bonding of the bottom face of the layer of foam to the sidewall. The surface of the tire is previously treated with a solution of TIC.

The reference consists of a strip of the same size of an elastomeric mixture constituting the above stainable decorative element. The reference is bonded to a tire sidewall under the same bonding conditions by means of the adhesive sold under the reference Neo-Rez R.550 by Avecia.

The tires carrying sample and reference were mounted on passenger cars of the Peugeot 806 type. These vehicles were subjected for 3 months to running on the road at a maximum speed of 110 km/h over a distance of between 3000 or 4000 km. At the end of this running, an observation of the tires was carried out.

The results obtained are entered in the following table.

|  | Sample | |
| --- | --- | --- |
|  | Reference: marking without foam | Marking with foam |
| Bottom layer | — | Polyurethane foam* |
| Top layer | Mixture | Mixture |
| Observation at the end of 3 months | Staining of marking | No staining |

*Polyurethane foam: Ref. 4085 from "3M"

With marking by means of the application according to the invention, no major modification of the appearance of the rigid marking element based on elastomers is observed. It does not tarnish, nor become discolored. Its coloring remains the same range of color as before the running tests.

What is claimed is:

1. A tire including an interior surface facing a center axis of the tire, and an external surface including a tread and a sidewall, the tire comprising at least one application disposed entirely on a surface portion of the external surface, the application including a first layer constituting a top layer in contact with air, and a second layer constituting a bottom layer in contact with the tire surface portion, the bottom layer comprising foam having a void ratio of at least 40%, wherein the foam comprises at least one plastics material with a density ranging from 0.02 to 0.1 g/cm³.

2. The tire according to claim 1 wherein the foam has a thickness of at least 0.5 mm.

3. The tire according to claim 2 wherein the foam has a thickness is in the range of from 0.5 mm to 30 mm.

4. The tire according to claim 1 wherein the surface portion is that of the tread.

5. The tire according to claim 4 wherein the surface portion comprises a groove base of the tread.

6. The tire according to claim 1 wherein the surface portion is that of the side wall.

7. The tire according to claim 1 wherein the top layer comprises a material selected from plastic, elastomer, ceramic and metal.

8. The tire according to claim 1 wherein the top layer comprises a material selected from paint and lacquer.

9. The tire according to claim 1 wherein the top layer comprises one of: a sensor, an electronic chip, an electrical supply cluster, a connector, a reception antenna and a transmission antenna.

10. A tire comprising at least one application disposed entirely within a cavity disposed in a surface portion of the tire located radially inwardly of a radially outermost face of a tread of the tire, the application including a first layer constituting a top layer in contact with air, and a second layer constituting a bottom layer in contact with the tire surface, the bottom layer comprising foam having a density in the range of from 0.02 g/cm³ to 0.5 g/cm³, wherein the cavity is defined by a groove of the tread.

11. The tire according to claim 10 wherein the foam has a void ratio of at least 40%.

12. The tire according to claim 11 wherein the foam has a thickness of at least 0.5 mm.

13. A tire comprising, on at least a part of a surface thereof, at least one application including a first layer constituting a top layer in contact with air, and a second layer constituting a bottom layer in contact with the tire surface, the bottom layer comprising foam, the application attached to the tire surface solely at the foam by an adhesive, the foam having at least one of the following properties:
   A) a void ratio of at least 40%,
   B) a thickness of at least 0.5 mm, and
   C) a density in the range of from 0.02 g/cm³ to 0.5 g/cm³
   wherein the top layer comprises one of: a sensor, an electronic chip, an electrical supply cluster, a connector, a reception antenna and a transmission antenna.

14. A tire comprising at least one application disposed entirely on a surface portion of the tire situated radially inwardly of a radially outermost face of a tread of the tire, the application including a first layer constituting a top layer in contact with air, and a second layer constituting a bottom layer in contact with the tire surface, the bottom layer comprising foam, the application attached to the surface portion solely at the foam by an adhesive, the foam having all of the following properties:
   A) a void ratio of at least 40%,
   B) a thickness of at least 0.5 mm, and
   C) a density in the range of from 0.02 g/cm³ to 0.5 g/cm³
   wherein the application is mounted within a cavity formed in the surface portion of the tire.

15. A tire comprising, on at least a part of a surface thereof, at least one application including a first layer constituting a top layer in contact with air, and a second layer constituting a bottom layer in contact with the tire surface, the bottom layer comprising foam having at least one of the following properties:
   A) a void ratio of at least 40%,
   B) a thickness of at least 0.5 mm, and
   C) a density in the range of 0.02 g/cm³ to 0.5 g/cm³
   wherein the top layer comprises a material selected from paint and lacquer.

16. A tire comprising at least one application disposed entirely on a surface portion of the tire located radially inwardly of a radially outermost face of a tread of the tire, the application including a first layer constituting a top layer in contact with air, and a second layer constituting a bottom layer in contact with the tire surface, the bottom layer comprising foam having a void ratio of at least 40%, wherein the top layer comprises one of: a sensor, an electronic chip, an electrical supply cluster, a connector, a reception antenna and a transmission antenna.

17. A tire comprising at least one application disposed entirely on a surface portion of the tire located radially inwardly of a radially outermost face of a tread of the tire, the application including a first layer constituting a top layer in contact with air, and a second layer constituting a bottom layer in contact with the tire surface, the bottom layer comprising foam having a void ratio of at least 40%, wherein the top layer comprises a material selected from paint and lacquer.

* * * * *